Nov. 22, 1960    M. P. BABCOCK    2,960,814
SUPPLEMENTAL LIFTING FINGER

Filed Sept. 29, 1958    2 Sheets-Sheet 1

INVENTOR:
MAURICE P. BABCOCK
BY
ATT'YS

Nov. 22, 1960 M. P. BABCOCK 2,960,814
SUPPLEMENTAL LIFTING FINGER
Filed Sept. 29, 1958 2 Sheets-Sheet 2

INVENTOR:
MAURICE P. BABCOCK
BY Merrell, Johnston,
Cook & Root
ATT'YS

United States Patent Office 2,960,814
Patented Nov. 22, 1960

2,960,814

SUPPLEMENTAL LIFTING FINGER

Maurice P. Babcock, Springfield, S. Dak.

Filed Sept. 29, 1958, Ser. No. 763,923

6 Claims. (Cl. 56—312)

This invention relates to gathering points and, more particularly, to gathering points which are particularly well adapted for use in the harvesting of sorghum crops such as, for example, milos, kafirs, and the like.

It is a primary object of my invention to afford novel gathering points for use on suitable harvesting machines such as, for example, combines, and the like, which are effective to raise lodged crops, and the like, into position wherein they may be effectively picked up and cut by the harvesting machine.

Another object of my invention is to afford gathering points of the aforementioned type embodying parts constituted and arranged in a novel and expeditious manner.

Another object of my invention is to provide gathering points of the aforementioned type which may be quickly and easily mounted on, and removed from, harvesting machines such as combines, and the like.

A further object of the present invention is to afford novel gathering points of the aforementioned type which may be mounted on combines, or the like, in a novel and expeditious manner whereby, when a harvesting machine is being moved along the ground in a harvesting operation, the gathering points are effective to ride along the ground even in rough terrain in position to effectively raise lodged crops, and the like, into position to be effectively harvested.

An object ancillary to the foregoing is to afford novel gathering points of the aforementioned type which may be readily mounted on a combine, or the like, in a novel and expeditious manner whereby they may also be effectively raised into elevated position when the cutter bar of the combine is elevated for travelling along the road or from one field to another, or the like.

Another object of the present invention is to afford a novel gathering point embodying a novel guide bar or guide finger constituted and arranged in a novel and expeditious manner.

Yet another object is to afford a novel gathering point embodying a novel guide bar which may be quickly and easily adjusted to various positions in a novel and expeditious manner.

A further object of the present invention is to provide a novel gathering point of the aforementioned type which is particularly effective to guide the stalks of lodged crops into elevated position wherein they may be effectively picked up and cut by a combine, or the like.

An object ancillary to the foregoing is to afford novel gathering points embodying novel guide bars having ridges extending therealong in a novel and expeditious manner, whereby the ridges are effective to assist in preventing the stalks of such crops from slumping and sliding sideways during the elevation thereof.

A further object of the present invention is to enable novel gathering points of the aforementioned type, and which are relatively long, to be constructed in a manner whereby they may be well and effectively supported in operative position on a combine, or the like.

An ancillary object is to enable gathering points to be afforded which may be effectively mounted on a combine, or the like, in a manner whereby they extend relatively far forwardly of the cutter bar guards of such a combine.

Another object of the present invention is to afford novel gathering points of the aforementioned type which are practical and efficient in operation and which may be readily and economically produced commercially.

Other and further objects of the present invention will be apparent from the following description and claims and are illustrated in the accompanying drawings which, by way of illustration, show the preferred embodiment of the present invention and the principles thereof, and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 1:
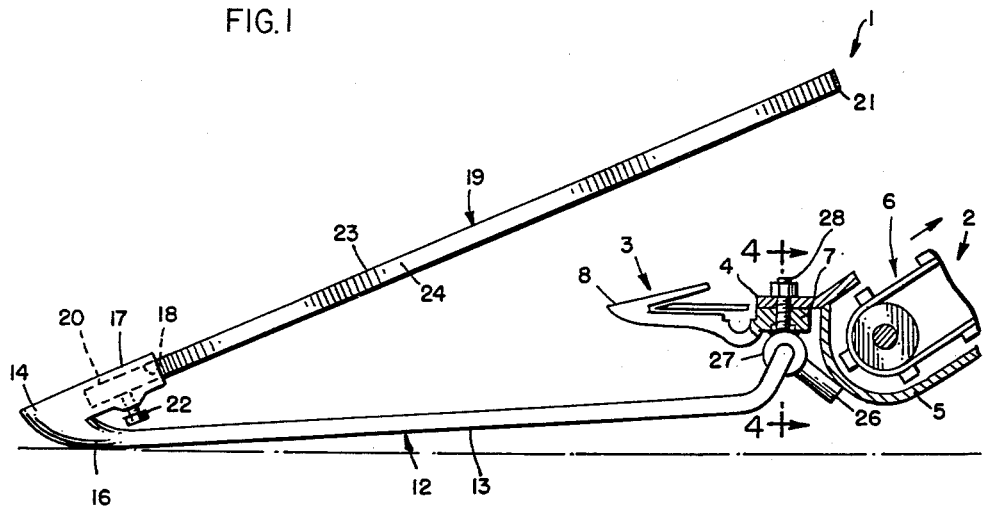
Fig. 1 is a side elevational view of a gathering point embodying the principles of my invention, showing the gathering point mounted in operative position on the header of a combine, parts of the combine being broken away and shown in section.

To illustrate the preferred embodiment of my invention, a gathering point 1, embodying the principles of my invention, is shown in the drawings mounted on a suitable harvester such as, for example, a combine 2.

Figure 2:
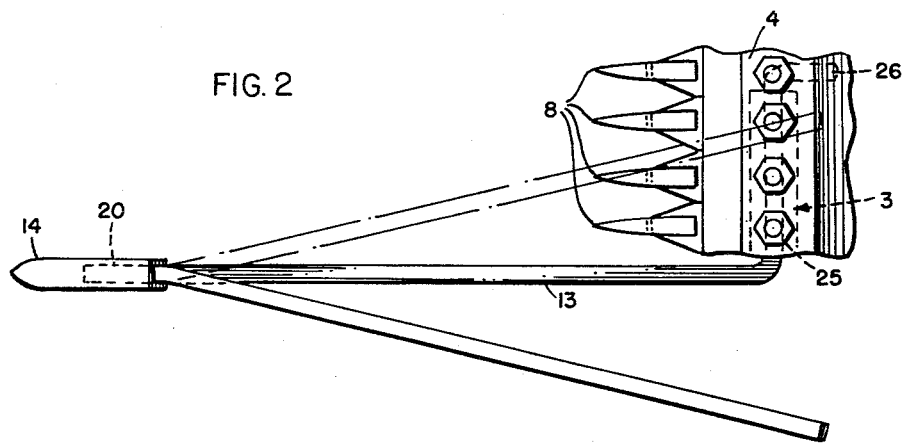
Fig. 2 is a top plan view of the gathering point shown in Fig. 1.

The combine 2, shown in the drawings, embodies the usual cutter bar guards 3 mounted on a suitable support such as a flange 4 projecting forwardly from the casing 5 of the conveyor 6 of the combine 2, Figs. 1 and 2. The cutter bar guards 3 are constructed in the customary manner, and each embodies a rear crossbar 7, from which two points 8 project forwardly in parallel spaced relation to each other.

Figure 4:
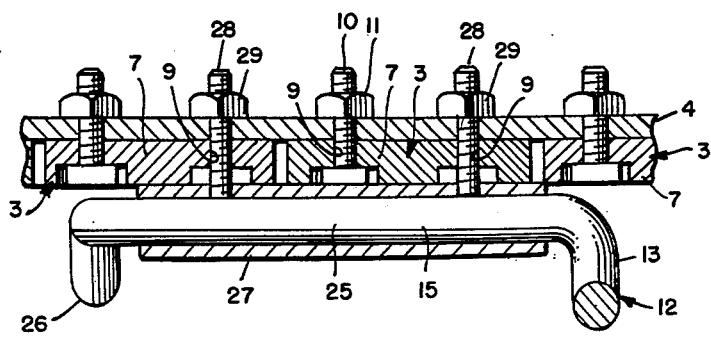
Fig. 4 is an enlarged detail sectional view taken substantially along the line 4—4 in Fig. 1.

Each of the cutter bar guards 3 has two openings 9 projecting vertically through the crossbar 7 thereof, Figs. 2 and 4, and a bolt 10 extends through one of the openings 9 of each of the cutter bar guards 3, and through the flange 4, a nut 11 being mounted on each such bolt 10 to thereby hold that end of the crossbar 7 of the cutter bar guards 3 clamped against the lower face of the flange 4 in juxtaposition thereto. When my novel gathering points 1 are not mounted on the combine 2, the other end of each of the crossbars 7 of the cutter bar guards 3 are also normally secured to the flange 4 in the same manner by bolts and nuts which are identical to the aforementioned bolts 10 and the nuts 11, respectively. However, when my novel gathering points 1 are mounted on the flange 4 of the combine 2, the second bolts 10 are not used on the cutter bar guards 3, other fastening means embodied in my novel gathering points replacing these second bolts, as will be discussed in greater detail presently.

My novel gathering point 1, shown in the drawings, embodies a supporting bar or runner 12 having a substantially straight elongated body member 13, with a beveled or rounded point 14 at the front end of the body member 13, and a substantially L-shaped supporting member 15 at the rear end of the body member 13, Figs. 1, 2 and 4.

The point 14 on the runner 12 has a leg 16 which forms a forwardly extending continuation of the body member 13, and another leg 17 which projects upwardly and rearwardly from the front end portion of the leg 16 at an acute angle thereto, Fig. 1. A rearwardly opening recess 18, which is preferably square in cross section, is formed in the rear end portion of the leg 17, and an elongated guide bar or finger 19 is mounted in the recess 18 and projects upwardly and rearwardly therefrom.

Figure 3:
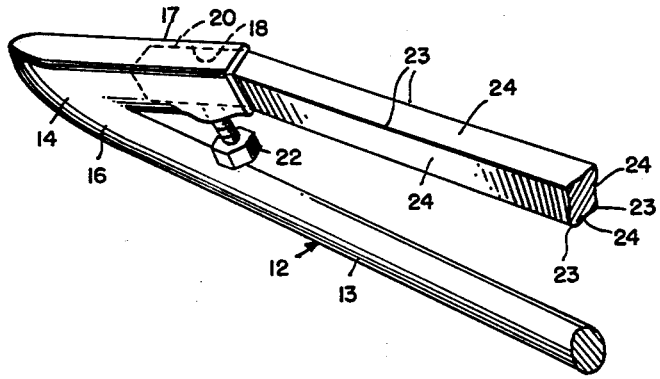
Fig. 3 is an enlarged, fragmentary, detail perspective view of a portion of the gathering point shown in Figs. 1 and 2.

The guide bar 19 is preferably substantially straight throughout its entire length except that one end portion 20 is disposed at an obtuse angle to the remainder of the guide bar 19, Figs. 2 and 3. The guide bar 19 is preferably complementary in cross-sectional size and shape to the recess 18 in the point 14 so that either the end portion 20 or the other end portion 21 thereof may be non-rotatably mounted in the recess 18 with a freely slidable but relatively snug fit. A screw or bolt 22 is mounted in the lower face of the leg 17 of the point 14, between the legs 16 and 17, in position whereby it may be screwed upwardly into engagement with the guide bar 19 when the latter is disposed in operative position in the recess 18 to thereby firmly hold the guide bar 19 against removal from the recess 18.

The recess 18 is referably so disposed in the point 14 that two opposite sides thereof face horizontally and are disposed in parallel vertical planes. When the recess 18 is so formed in the point 14, and the guide bar 19 is disposed therein, the four longitudinally extending corners 23 of the guide bar 19 are so disposed that two of them constitute the opposite upper longitudinal edge portions of the guide bar 19 for a purpose which will be discussed in greater detail presently.

It will be remembered that the end portion 20 of the guide bar 19 is disposed at an obtuse angle to the remainder thereof, and I prefer that the offset of the end portion 20 from the remainder of the guide bar 19 be in a direction that extends between, and parallel to, the planes of two opposite ones of the four faces 24 of the guide bar 19. It will be seen that with the offset of the end portion 20 from the remainder of the guide bar 19 being in the aforementioned direction, when the end portion 20 of the guide bar 19 is disposed in the recess 18 in position to cause the remainder of the guide bar 19 to project horizontally to the right or to the left, as viewed when looking rearwardly along the runner 12, as shown in solid lines and broken lines, respectively, in Fig. 2, the offset is only in a horizontal direction and, therefore, the guide bar 19 may be disposed in either of these positions without altering the angle of inclination thereof, and while keeping the upper face 24 disposed in directly upwardly facing position.

The supporting member 15 on the rear end of the main body member 13 of the runner 12 is substantially L-shaped, having an elongated straight leg 25 projecting perpendicularly to the main body member 13, and another leg 26 projecting perpendicularly to the leg 25, Figs. 1 and 4. The leg 25 is journalled in a sleeve 27, rotatably mounted thereon between the legs 26 and 13, Fig. 4. Two bolts 28 project radially outwardly from one side of the sleeve 27, in parallel relation to each other, in such position that when the sleeve 27 is disposed beneath the crossbars 7 of two cutter bar guards 3, one of the bolts 28 may be extended upwardly through one of the openings 9 in one cutter bar guard 3, and the other bolt 28 may be extended upwardly through the corresponding opening 9 in the other of the two adjacent cutter bar guards 3, as shown in Fig. 4. Nuts 29 may be mounted on the bolts 28 to thereby clamp the sleeve 27 upwardly against the face of the cross bars 7 of the aforementioned two adjacent cutter bar guards 3, and it will be seen that the bolts 28 may be used to replace two of the bolts 10 for the purpose of holding the cutter bar guards 3 on the flange 4. The bolts 28 may be secured to the sleeve 27 in any suitable manner such as, for example, mounting them in one side thereof and welding the same thereto.

The leg 26 of the supporting member 15 is so disposed on the leg 25 that when the gathering point 1 is mounted on the combine 2 with the sleeve 27 disposed in juxtaposition to the lower faces of the cross bars 7 of the two cutter bar guards 3, the leg 26 is disposed in engagement with the front end of the casing 5 when the cutter bar of the combine 2 is disposed in elevated position. When the cutter bar of the combine 2 is disposed in lowered, operable position, with the runner 12 engaged with the ground, the leg 26 is spaced downwardly from the front end portion of the casing 5 so that the gathering point 1 is free to pivot in its supporting sleeve 27 and thereby follow the contour of the ground.

As will be appreciated by those skilled in the art, the points 8 of the cutter bar guards on combines, and the like, customarily project forwardly of the bolts securing them to the frame of the combine such as, for example, the bolts 10 and 28, a minimum of approximately five and one-half or six inches. Certain crops, and especially the sorghum crops such as, for example, the milos and kafirs, grow to a relatively great height and in order to eliminate the waste occasioned by threshing any more of the stalk than is necessary, the cutter bars of combines used in harvesting such crops are commonly elevated to a height of at least a foot above the ground, which means that the stalk of a lodged crop being harvested should be raised at least a foot and a half above the ground to insure proper cutting and pick-up of the heads by the combine or other harvesting machine. For efficient raising of stalks to such a height, the gathering points should extend out in front of the combine at least six or seven times further than the cutter bar guards so that the angle of inclination of the guide bar 19 is not so great that the stalks being raised will not readily slide upwardly therealong. This requires a gathering point which is sturdy in construction and which may be mounted on a combine by means of a strong supporting connection. I have found that by constructing my novel gathering points 1 of cold rolled steel with the main body member 13 and the supporting member 15 being one inch in diameter; the guide bar 19 being one inch square; the sleeve 27 being one and one-half inch in outside diameter; the front end of the point 14 being spaced from the longitudinal center line of the leg 25 a distance of three feet measured along a line parallel to the main body member 13; and with the leg 17 and the recess therein being so disposed that, when the guide bar 19 is mounted in the recess 18 in either of the positions shown in Fig. 2, the rear end of the guide bar 19 is disposed above the sleeve 27 a distance of one foot, measured along a line perpendicular to the main body member 13, a gathering point is afforded which is effective to efficiently raise badly lodged milo crops into position wherein they may be effectively and efficiently harvested by a combine, or the like, on which my novel gathering points 1 are mounted.

In cutter bar guards of the type shown in the drawings, the openings 9 therein are commonly spaced along the crossbars 7 thereof a distance of three inches, and are commonly of such size as to receive three-eighth inch bolts. I have found that by making my sleeves 27 of such length that the bolts 28 thereon may be mounted in alternate ones of the openings 9 in the cutter bar guards, and by making the bolts 28 three-eighth inch cold rolled steel bolts, the gathering points 1 are effectively secured to the harvesting machine in a sturdy manner. It will be seen that with my novel gathering points 1 so mounted on a harvesting machine such as, for example, the combine 2, the points 8 of the cutter bar guards 3 are not affected by shocks or jars received by the gathering points 1 and, therefore, are not subject to being broken by such shocks or jars.

In the operation of a harvesting machine such as, for example, a combine, having my gathering points 1 mounted thereon for raising lodged sorghum crops such as milos, and the like, the gathering points 1 may be mounted along the flange 4 in such position that at least one of the gathering points 1 is disposed between each row of stalks of the crop being harvested. In crops which have lodged only to a relatively minor extent, the guide bars 19 may be mounted in the legs 17 in such position that the guide bars 19 of the gathering points on each side of the midpoint of the length of the cutter bar of the combine slant horizontally inwardly from front to rear toward such midpoint. Under such conditions, it is normally not necessary to change the direction of offset of the guide bars 19 of the gathering points 1 at the ends of the field, my novel gathering points 1 being normally effective under those conditions to effectively raise such lodged crops.

However, under some conditions, when the crop to be harvested is badly lodged, it is often desirable to have the guide bars 19 of my novel gathering points 1 so disposed relative to the runners 12 that the guide bars 19 not only project upwardly therefrom but also slant horizontally with respect thereto from front to rear in a direction toward which it is desired to move the heads of the crop. This means that it is desirable that the guide bars 19 project horizontally from the legs 17 in the same compass direction during a run of a combine in one direction through a field and also during the run of a combine in the reverse direction through the field. With my novel gathering points 1, this may be readily accomplished by merely loosening the bolts 22, removing the guide bars 19 therefrom, rotating the thus removed guide bars 19 one hundred and eighty degrees around their longitudinal axes and again inserting the guide bars 19 into the recesses 18 and tightening the screws or bolts 22.

Many crops, and particularly milos, and the like, have stalks which are so long that they tend to bend down under the weight of the heads even when they have not lodged. My novel gathering points 1 may also be used effectively to assist in the harvesting of these crops under such conditions. Thus, for example, the gathering points 1 may be mounted on the harvesting machine in pairs, with the gathering points 1 of each pair disposed on the combine in such position that they will be disposed on opposite sides of a row of stalks during passage of the machine through the field. The guide bars 19 of each of the pair of gathering points 1 would, under such conditions, be offset inwardly toward each other to thereby afford effective guides for straightening the stalks passing therebetween, and guiding the stalks into the combine in proper position.

Figure 5:
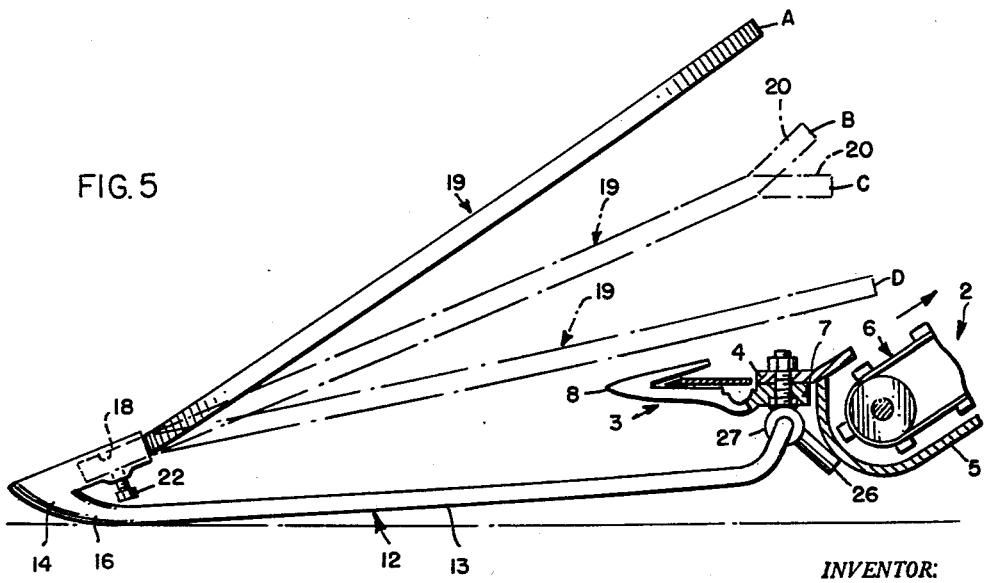
Fig. 5 is a side elevational view of the gathering point shown in Fig. 1, with the guide bar thereof shown disposed in different positions.

Although the guide bars 19 of my novel gathering points 1 are normally disposed in one of the two positions shown in Figs. 1 and 2, it will be seen that if desired, they may also be disposed in either one of the four positions A, B, C or D, respectively, shown in Fig. 5. It will be seen that in each of these positions the end portions 20 and 21 are disposed in the same vertical plane so that the guide bar 19 is disposed directly above the main body portion 13 of the runner 12, and is not offset horizontally therefrom. In position A, the end portion 20 of the guide bar 19 is disposed in the recess 18 in such position that the end portion 20 is offset from the remainder of the guide bar 19 at an upwardly opening obtuse angle. In position D, the supporting bar 19 has been rotated around its axis through one hundred and eighty degrees from the position shown at A, so that the end portion 20 is offset from the remainder of the guide bar 19 at a downwardly opening obtuse angle. In position B, the other end portion 21 of the guide bar 19 has been disposed in the recess 18, with the end portion 20 disposed at the rear end of the guide bar 19 and offset from the remainder thereof at an upwardly opening obtuse angle. In position C, the guide bar 19 has been rotated one hundred and eighty degrees around its axis from position B to a position wherein the end portion 20 is offset from the remainder of the guide bar 19 at a downwardly opening obtuse angle.

With the guide bar 19 of my novel gathering point 1 constructed in the manner which I prefer, namely, with a square cross section, it will be seen that the guide bar 19 has longitudinally extending ridges thereon afforded by the corners 23 thereof. These ridges, I have found, are effective in assisting to prevent the stalks being raised from slumping or sliding downwardly transversely across the guide bars 19 during the stalk-raising operation. It will be appreciated by those skilled in the art that guide bars 19 of square cross section are shown herein merely by way of illustration and not by way of limitation, and that guide bars having specific changes in the construction thereof may be used without departing from the purview of my invention. However, I prefer that the recess 18 and the guide bar 19 be non-circular in cross section so as to prevent the guide bars 19 from rotating in the recess 18. Also, I prefer that ridges such as those afforded by the upwardly disposed corners 23 of the guide bar 19 shown in the drawings be afforded in such position that they are disposed at each longitudinal upper side of the guide bar 19 in position to effectively engage the stalks being raised by the gathering points 1.

From the foregoing it will be seen that I have afforded novel gathering points which may be quickly and easily attached to and removed from harvesting machines such as combines, and the like.

Also, it will be seen that I have afforded novel gathering points which are well adapted for raising lodged crops, and the like, and are particularly well adapted for raising lodged sorghum crops.

In addition, it will be seen that I have afforded novel gathering points wherein the position of the guide bars thereof may be quickly and easily changed.

Also, it will be seen that I have afforded novel gathering points which are effective and efficient in operation, and may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A gathering point for attachment to harvesting machines for lifting lodged stalks, and the like, comprising an elongated supporting bar having a front end portion and a rear end portion, another elongated bar mounted on said front end portion and extending upwardly and rearwardly therefrom, said rear end portion including a substantially L-shaped portion having one leg projecting substantially perpendicularly to the length of said front end portion, and another leg projecting rearwardly from said one leg, and means for pivotally mounting said supporting bar on a portion of such a harvester for vertical pivotal movement between a position wherein said other leg is disposed in abutting engagement with a lower face of said portion of said harvester and a position wherein said other leg is disposed at a downwardly and rearwardly opening acute angle to said face, said means comprising a sleeve rotatably mounted on said one leg, and fastening means mounted on said sleeve for securing said sleeve to said portion of such a harvester.

2. A crop lifter for attachment to a harvesting machine for lifting lodged crops into position to be harvested and comprising an elongated runner having a rear end portion and a front end portion including a rearwardly opening V-shaped point, means on said rear end portion for pivotally mounting said runner on such a harvesting machine in forwardly projecting relation to the cutter bar of the latter, said point having a rearwardly opening socket of square internal cross section, an elongated bar having a square cross section complementary in size to said socket, said bar being removably mounted in said socket and projecting upwardly and rearwardly therefrom at an obtuse angle to the vertical plane through the intermediate portion of said runner, and means releasably holding said bar in said socket.

3. A crop lifter for attachment to a harvesting machine for lifting lodged crops into position to be harvested and comprising an elongated runner having a rear end portion and a front end portion including a rearwardly opening V-shaped point, means on said rear end portion for pivotally mounting said runner on such a harvesting machine in forwardly projecting relation to the cutter bar of the latter, said point having a rearwardly opening elongated socket of square internal cross section having its longitudinal center line disposed in the same vertical plane as the longitudinal center line of the main body portion of said runner, an elongated bar of square cross-sectional shape and complementary in cross-sectional size to said socket, said bar being removably mounted in said socket and projecting upwardly and rearwardly therefrom at an obtuse angle to said vertical plane, said bar being adapted to be mounted in said socket in another position wherein said bar projects on the other side of said vertical plane at an obtuse angle thereto, and means mounted on said point and releasably engaged with said bar for holding the latter in said socket.

4. A gathering point for attachment to a harvesting machine for lifting lodged stalks, and the like, comprising an elongated supporting bar having a front end portion and a rear end portion, means on said rear end portion adapted to releasably mount said bar on said harvesting machine in forwardly projecting relation to the cutter bar of the latter, another elongated bar having one end portion offset at an obtuse angle to the remaining portion thereof, said other bar being non-circular in transverse cross-section, and means on said front end portion for supporting said other bar in upwardly and horizontally projecting relation thereto, said last mentioned means comprising socket means releasably and non-rotatably engaging said one end portion.

5. A gathering point for attachment to a harvesting machine for lifting lodged stalks, and the like, comprising an elongated supporting bar having a front end portion and a rear end portion, means on said rear end portion for releasably mounting said bar on such a harvesting machine in forwardly projecting relation to the cutter bar of the latter, another elongated bar having one end portion offset at an obtuse angle to the remaining portion thereof, said one end portion and said remainder each being substantially straight, said other bar having at least one ridge extending longitudinally thereof, and means on said front end portion for supporting said other bar in upwardly and horizontally projecting relation thereto, said last mentioned means including a socket complementary in transverse cross-sectional shape to said other bar and releasably receiving said other bar therein.

6. A gathering point for attachment to a harvesting machine for lifting lodged stalks, and the like, comprising an elongated supporting bar having a front end portion and a rear end portion, means on said rear end portion for releasably mounting said bar on such a harvesting machine in forwardly projecting relation to the cutter bar of the latter, another elongated bar having one end portion offset at an obtuse angle to the remaining portion thereof, said other bar having circumferentially spaced elongated ridges extending longitudinally thereof, and means on said front end portion for releasably securing said bar in any one of a plurality of upwardly and rearwardly extending directions relative to said front end portion, said last mentioned means including a socket complementary in transverse cross-section to said other bar non-rotatably engageable with said other bar in any one of a plurality of positions of the latter, said ridges being so disposed on said other bar that one of said ridges extends along the upper peripheral portion thereof and projects in the general direction toward which such stalks are to be raised in all said positions of said other bar.

References Cited in the file of this patent
UNITED STATES PATENTS

| | | |
|---|---|---|
| 1,005,169 | Dougherty | Oct. 11, 1911 |
| 1,200,896 | Smith | Oct. 10, 1916 |
| 2,166,723 | Knight | July 18, 1939 |
| 2,290,404 | Cardinal | July 21, 1942 |
| 2,552,623 | Dye | May 15, 1951 |
| 2,618,114 | Gaterman | Nov. 18, 1952 |
| 2,816,412 | Fisher | Dec. 17, 1957 |